United States Patent
Pucker, II et al.

(10) Patent No.: US 6,298,144 B1
(45) Date of Patent: Oct. 2, 2001

(54) DEVICE FOR AND METHOD OF DETECTING MOTION IN AN IMAGE

(75) Inventors: Leonard G. Pucker, II, Columbia; David B. Sofge, Crownsville, both of MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 0 days.

(21) Appl. No.: 09/081,608

(22) Filed: May 20, 1998

(51) Int. Cl.[7] .............................. G06K 9/00; G06K 9/38; H04N 7/18
(52) U.S. Cl. .......................... 382/103; 382/107; 382/172; 348/155
(58) Field of Search ..................................... 382/107, 218, 382/219, 236, 205, 212, 213, 262, 264, 169, 168, 170–72, 103; 342/176, 179; 367/68, 70, 71; 348/155

(56) References Cited

U.S. PATENT DOCUMENTS

| | | |
|---|---|---|
| 3,641,257 | 2/1972 | Taylor . |
| 4,811,090 * | 3/1989 | Khurana ................................. 358/93 |
| 4,894,716 | 1/1990 | Aschwanden et al. . |
| 4,918,633 * | 4/1990 | Sullivan ............................... 364/574 |
| 5,111,511 | 5/1992 | Ishii et al. . |
| 5,157,732 | 10/1992 | Ishii et al. . |
| 5,365,603 | 11/1994 | Karmann . |
| 5,504,473 * | 4/1996 | Cecic et al. ........................... 340/541 |
| 5,535,302 | 7/1996 | Tsao . |
| 5,543,858 | 8/1996 | Wischermann . |
| 5,548,659 | 8/1996 | Okamoto . |
| 5,586,202 | 12/1996 | Ohki et al. . |
| 5,588,067 | 12/1996 | Peterson et al. . |
| 5,589,884 | 12/1996 | Ohguchi . |
| 5,600,731 | 2/1997 | Sezan et al. . |
| 5,627,586 | 5/1997 | Yamasaki . |
| 5,644,386 * | 7/1997 | Jenkins et al. ....................... 356/4.01 |
| 6,084,981 * | 7/2000 | Horiba et al. ......................... 382/157 |

OTHER PUBLICATIONS

Rogers, L.S. et al., "SAR Image despeckling using the multiscale edge representation", IEEE International Geoscience and Remote sensing symposium, Jul. 1998.*

W.B. Baringer et al., "High Speed High Accuracy Motion Detection and Tracking on the Parallel Piplined Protection Engine," Sixth MDSP Workshop, 1989, p. 70, Session TAI, IEEE, N.Y., N.Y., USA.

Thomas Komarek et al., "Array Architecture for Block Matching Algorithms", IEEE Transactions on Circuits and Systems, vol. 36, No. 10, Oct. 1989.

* cited by examiner

Primary Examiner—Amelia M. Au
Assistant Examiner—Martin Miller
(74) Attorney, Agent, or Firm—Robert D. Morelli

(57) ABSTRACT

A device for and method of detecting motion between a reference image and a test image by acquiring the images; aligning the images; dividing the images into blocks; masking certain blocks; differencing corresponding blocks; median filtering the differences; low-pass filtering the outputs of the median filter; generating a normalized histogram for each output of the low-pass filter; generating a model of gaussian noise; calculating the distance between the noise model and each normalized histogram; comparing each distance calculated to a user-definable threshold; and determining if motion has occurred between the images if a certain number of distance calculations are at or above the user-definable threshold. If a scene is to be continuously monitored and no motion occurred between the previous reference image and the previous test image then a new test image is acquired and compared against the previous reference image as described above. If the scene is to be continuously monitored and motion has occurred between the previous reference image and the previous test image then replace the previous reference image with the previous test image, acquire a new test image, and compare the new test image to the new reference image as described above.

14 Claims, 2 Drawing Sheets

DEVICE FOR AND METHOD OF DETECTING MOTION IN AN IMAGE

FIELD OF THE INVENTION

This invention relates to image analysis and, more particularly, to the detection of motion that may have occurred between subsequent frames of an image.

BACKGROUND OF THE INVENTION

The ability to detect motion that may have occurred between subsequent frames, or images, in a video of a scene is useful in applications such as machine vision, motion compensation, and data compression. The most popular methods of motion detection and estimation utilize a "block matching" method.

In a block matching method, a first image of a scene (i.e., a reference image) and a second image (i.e., a test image) are segmented into N×M blocks. Each block is comprised of pixels. Corresponding blocks from the reference image and the test image are compared mathematically using some matching method. Corresponding pixels in corresponding blocks are called pixel pairs. Popular matching methods presently being used include a "mean of the absolute differences" (MAD) method and a "mean squared error" (MSE) method. MAD computes the sum of the absolute value of the difference of each pixel pair of the corresponding blocks in order to generate a score. MSE computes the sum of the square of the difference of each pixel pair of the corresponding blocks.

If little motion occurs between the reference image and the test image then the pixel pairs will cancel when differenced in both MAD and MSE and a low score will result. If sufficient motion has occurred then the pixel pair won't cancel and a high score will result. The score is then compared to a threshold to determine whether or not motion has occurred between the reference image and the test image.

If no motion has occurred between the reference image and the test image then the test image is discarded and a new test image is acquired. The steps described above are then repeated using the new test image in order to determine if motion has occurred between the reference image and the new test image.

If motion has occurred between the reference image and the test image then such motion is indicated, the reference image is discarded, the test image becomes the new reference image, a new test image is acquired, and the steps described above are repeated using the new reference image and the new test image to determine whether or not motion has occurred between the new reference image and the new test image.

MAD and MSE are easily implemented, but tend to perform badly when gaussian noise is present in two images that should not otherwise indicate that any motion has occurred. Gaussian noise occurs frequently in sonograms and radar images. One reason why MAD and MSE may falsely indicate motion when there isn't any if gaussian noise is present in the images is that gaussian noise in the reference frame may not be related at all to gaussian noise in the test image. So, the two gaussian noise images may not cancel when differenced. Gaussian noise minus gaussian noise results in gaussian noise. If two images should not indicate any motion but contain gaussian noise then MAD and MSE will assign a high score to the gaussian noise result instead of assigning a low score as expected.

Other prior art matching methods include cross-correlation and the Radon Transform. These methods perform better than MAD and MSE in the presence of gaussian noise, but falsely indicate motion in the presence of strong gaussian noise which commonly occurs in sonograms or radar images.

U.S. Pat. No. 3,641,257, entitled "NOISE SUPPRESSOR FOR SURVEILLANCE AND INTRUSION-DETECTING SYSTEM," discloses a correlation method for dealing with noise in a surveillance and intrusion detection system. Correlation is insufficient to guard against noise-induced false detection of motion in the presence of gaussian noise that is commonly found in sonograms or radar images (i.e., strong gaussian noise). U.S. Pat. No. 3,641,257 is hereby incorporated by reference into the specification of the present invention.

U.S. Pat. No. 4,894,716, entitled "T.V. MOTION DETECTOR WITH FALSE ALARM IMMUNITY," discloses the use of a low-pass filter and, mainly, a phase-detector to guard against noise-induced false detection of motion. Phase detection is insufficient to guard against noise-induced false detection of motion in the presence of gaussian noise that is commonly found in sonograms or radar images. U.S. Pat. No. 4,894,716 is hereby incorporated by reference into the specification of the present invention.

U.S. Pat. No. 5,111,511, entitled "IMAGE MOTION VECTOR DETECTING APPARATUS," discloses the use of both a low-pass filter and a high-pass filter to guard against noise-induced false detection of motion. Using just a low-pass filter and a high-pass filter is insufficient to guard against noise-induced false detection of motion in the presence of gaussian noise that is commonly found in sonograms or radar images. U.S. Pat. No. 5,111,511 is hereby incorporated by reference into the specification of the present invention.

U.S. Pat. No. 5,157,732, entitled "MOTION VECTOR DETECTOR EMPLOYING IMAGE SUBREGIONS AND MEDIAN VALUES," discloses the use of a median filter to guard against noise-induced false detection of motion. Median filtering by itself is insufficient to guard against noise-induced false detection of motion in the presence of gaussian noise that is commonly found in sonograms or radar images. U.S. Pat. No. 5,157,732 is hereby incorporated by reference into the specification of the present invention.

U.S. Pat. No. 5,365,603, entitled "METHOD FOR ANALYZING MOVEMENTS IN TEMPORAL SEQUENCES OF DIGITAL IMAGES," discloses the use of a time-recursive filter to guard against noise-induced false detection of motion. Using just a time-recursive filter is insufficient to guard against noise-induced false detection of motion in the presence of gaussian noise that is commonly found in sonograms or radar images. U.S. Pat. No. 5,365,603 is hereby incorporated by reference into the specification of the present invention.

U.S. Pat. No. 5,535,302, entitled "METHOD AND APPARATUS FOR DETERMINING IMAGE AFFINE FLOW USING ARTIFICIAL NEURAL SYSTEM WITH SIMPLE CELLS AND LIE GERMS," discloses the use of least square error fitting circuit based on a Lie group model to guard against noise-induced false detection of motion. Using just this matching method is insufficient to guard against noise-induced false detection of motion in the presence of gaussian noise that is commonly found in sonograms or radar images. U.S. Pat. No. 5,535,302 is hereby incorporated by reference into the specification of the present invention.

U.S. Pat. No. 5,543,858, entitled "METHOD OF AND APPARATUS FOR REDUCING NOISE IN A MOTION DETECTOR SIGNAL," discloses the use of recursive filtering (or low-pass filtering) to guard against noise-induced false detection of motion. Using just recursive filtering is insufficient to guard against noise-induced false detection of motion in the presence of gaussian noise that is commonly found in sonograms or radar images. U.S. Pat. No. 5,543,858 is hereby incorporated by reference into the specification of the present invention.

U.S. Pat. No. 5,548,659, entitled "METHOD AND APPARATUS FOR DETECTING CHANGES IN DYNAMIC IMAGES," discloses the use of a noise model based on the input images and the difference of the input images to guard against noise-induced false detection of motion. Such a noise model is insufficient to guard against noise-induced false detection of motion in the presence of gaussian noise that is commonly found in sonograms or radar images because gaussian noise does not cancel upon differencing with different gaussian noise but results in gaussian noise that may induce a false detection of motion. U.S. Pat. No. 5,548,659 is hereby incorporated by reference into the specification of the present invention.

U.S. Pat. No. 5,586,202, entitled "MOTION DETECTING APPARATUS," does not address noise-induced false detection of motion, and is insufficient to guard against noise-induced false detection of motion in the presence of gaussian noise that is commonly found in sonograms or radar images. U.S. Pat. No. 5,586,202 is hereby incorporated by reference into the specification of the present invention.

U.S. Pat. No. 5,588,067, entitled "MOTION DETECTION AND IMAGE ACQUISITION APPARATUS AND METHOD OF DETECTING THE MOTION OF AND ACQUIRING AN IMAGE OF AN OBJECT," discloses the use of a correlation function to guard against noise-induced false detection of motion. A correlation function is insufficient to guard against noise-induced false detection of motion in the presence of gaussian noise that is commonly found in sonograms or radar images. U.S. Pat. No. 5,588,067 is hereby incorporated by reference into the specification of the present invention.

U.S. Pat. No. 5,589,884, entitled "ADAPTIVE QUANTIZATION CONTROLLED BY SCENE CHANGE DETECTION," does not address noise-induced false detection of motion and is, therefore, insufficient to guard against noise-induced false detection of motion in the presence of gaussian noise that is commonly found in sonograms or radar images. U.S. Pat. No. 5,589,884 is hereby incorporated by reference into the specification of the present invention.

U.S. Pat. No. 5,600,731, entitled "METHOD FOR TEMPORALLY ADAPTIVE FILTERING OF FRAMES OF A NOISY IMAGE SEQUENCE USING MOTION ESTIMATION," discloses the use of linear minimum mean square error matching to guard against noise-induced false detection of motion. Using such a matching method is insufficient to guard against noise-induced false detection of motion in the presence of gaussian noise that is commonly found in sonograms or radar images. U.S. Pat. No. 5,600,731 is hereby incorporated by reference into the specification of the present invention.

U.S. Pat. No. 5,627,586, entitled "MOVING BODY DETECTION DEVICE OF CAMERA," does not address noise-induced false detection of motion and is, therefore, insufficient to guard against noise-induced false detection of motion in the presence of gaussian noise that is commonly found in sonograms or radar images. U.S. Pat. No. 5,627,586 is hereby incorporated by reference into the specification of the present invention.

In an article entitled "High Speed High Accuracy Motion Detection and Tracking on the Parallel Pipelined Projection Engine," published in New York, N.Y. by the IEEE on Sep. 6, 1989 in *The Sixth Multidimensional Signal Processing Workshop,* page 242, W. B. Baringer and R. W. Brodersen disclose the use of the Radon transform to reduce video noise. The Radon transform is insufficient to guard against noise-induced false detection of motion in the presence of gaussian noise that is commonly found in sonograms or radar images.

In an article entitled "Array Architecture for Block Matching Algorithms," published in New York, N.Y. by the IEEE in 1989, pages 1301–1308, Thomas Komarek and Peter Pirsch disclose the use of the "mean of the absolute differences" (MAD) in a block matching algorithm. MAD is insufficient to guard against noise-induced false detection of motion in the presence of gaussian noise that is commonly found in sonograms or radar images.

SUMMARY OF THE INVENTION

It is an object of the present invention to detect motion between subsequent images of a scene.

It is another object of the present invention to detect motion between subsequent images of a scene in the presence of gaussian noise that would normally occur in a sonogram or a radar image.

The present invention is a device for and a method of detecting motion in subsequent images of a scene in the presence of gaussian noise that would normally occur in a sonogram or a radar image.

A first image, or reference image, is acquired from a scene. The reference image is comprised of pixels.

A second image, or test image, is acquired from the scene. The test image is also comprised of pixels.

The reference image and the test image are aligned to each other in order to eliminate one source of false motion detection.

The reference image and the test image are each divided into N×M blocks.

The user may define areas of the reference image and the test image to ignore or mask.

Corresponding blocks of the reference image and the test image that are to be considered are differenced (i.e., a pixel in one block is subtracted from the corresponding pixel in the corresponding block of the other image).

To eliminate shot, or spike, noise, that may cause a false detection of motion, each block of the difference between the reference image and the test image is median filtered.

To eliminate any false detection of motion that may be caused by jitter in the acquisition of the reference image or the test image, each median filtered block is low-pass filtered.

A normalized histogram is generated for each low-pass-filtered block.

A model of gaussian noise is generated.

A distance is calculated between each normalized histogram and the noise model.

Each calculated distance is compared to a user-defined threshold.

The user may define motion as having occurred if one calculated distance is at, or above, the user-definable threshold or if a user-definable number of calculated distances representing adjoining difference blocks of the reference image and the test image are at, or above, the user-definable threshold. The latter approach is preferred in the present invention.

Additional steps are required to continuously monitor the scene. If it was determined that no motion has occurred between the reference image and the test image then the test image is discarded and a new test image of the scene is acquired. The steps described above, starting with the step of dividing the reference image and the test image into N×M blocks, are then performed on the reference image and the new test image to determine whether or not motion has occurred between the reference image and the new test image.

If it was determined that motion has occurred been the reference image and the test image then the reference image is discarded, the test image is designated as the new reference image, and a new test image of the scene is acquired. The steps described above, starting with the step of dividing the reference image and the test image into N×M blocks, are then performed on the new reference image and the new test image to determine whether or not motion has occurred between the new reference image and the new test image.

DETAILED DESCRIPTION

The present invention is a device for and a method of detecting motion between subsequent images of a scene. The present invention detects motion in the presence of gaussian noise that is commonly present in sonograms and radar images (i.e., a high level of gaussian noise or strong gaussian noise).

Figure 1:
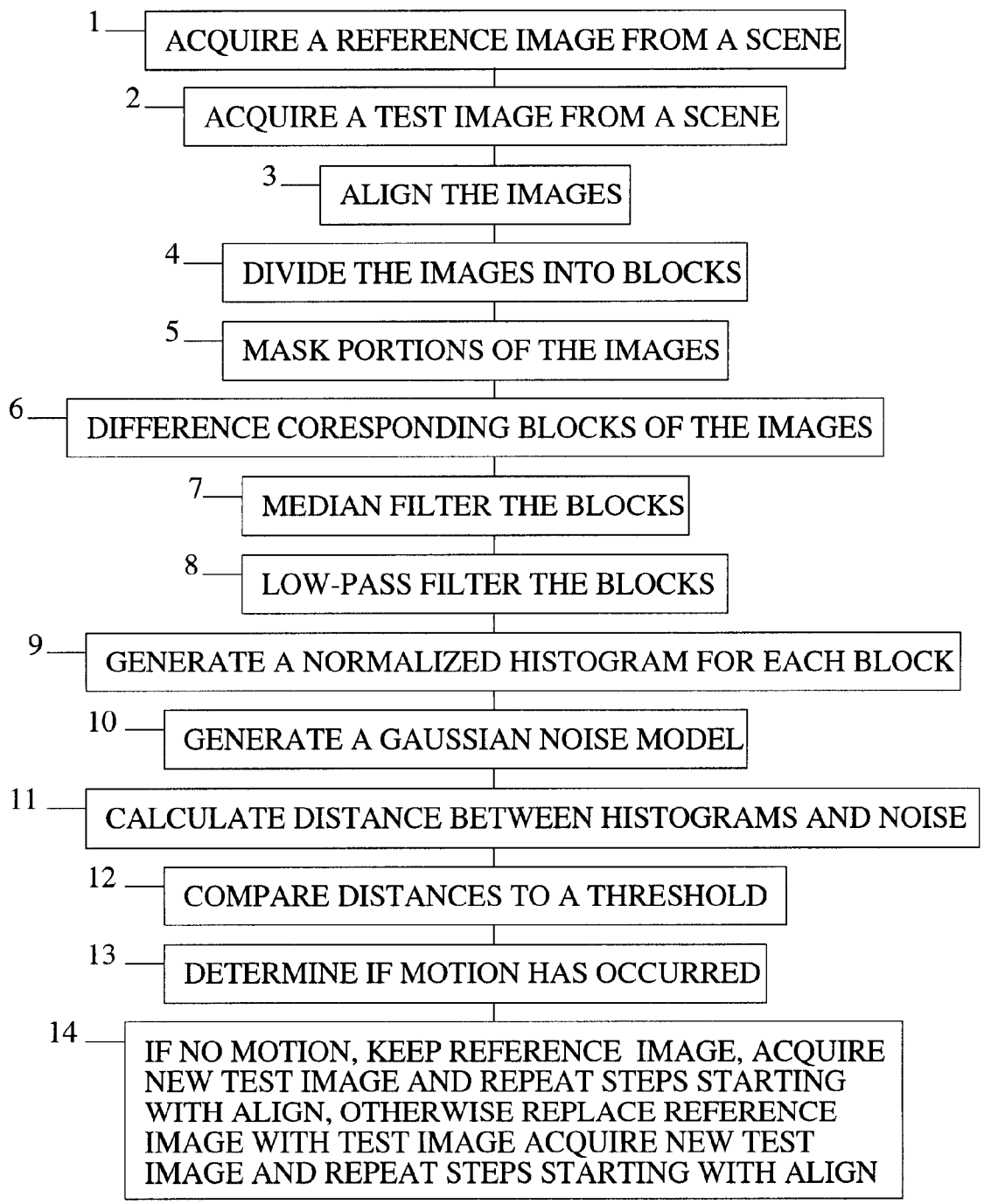
FIG. 1 is a list of steps of the method of the present invention.

FIG. 1 is a list of the steps of the method of the present invention.

The first step in the method is to acquire a first image (hereinafter called a reference image) of the scene in which a user would like to detect if any motion has occurred. The reference image is comprised of pixels and is used to compare subsequent images of the scene in order to determine whether or not motion has occurred in the scene.

The second step in the method is to acquire a second image (hereinafter called a test image) of the scene. The test image is also comprised of pixels. The test image will be compared to the reference image in order to determine whether or not motion has occurred between the reference image and the test image.

The third step in the method is to align the reference image and the test image. This step is necessary to reduce false detection of motion which may be caused by camera panning or line jitter. Alignment may be done horizontally or vertically. In the preferred embodiment, alignment is done horizontally only.

The fourth step in the method is to divide the aligned reference image and the test image each into N×M blocks. The user may define the block size. Corresponding blocks in the reference image and the test image will later be compared in order to determine whether or not motion has occurred between the reference image and the test image.

The fifth step in the method is to allow the user to define those areas of the reference image, and corresponding areas in the test image, to ignore or mask. This allows a scene to be monitored that includes known motion that is of no interest (e.g., swaying trees, water fountains, etc.).

The sixth step in the method is to difference corresponding non-masked blocks in the reference image and the test image. That is, each non-masked block of the test image is subtracted from its corresponding block in the reference image on a pixel by pixel basis. If the two images for a particular block are identical then this step will result in no image data remaining.

Two images for a particular block may be identical in two ways. The first way is that the two images are identical with no noise present in either image. The second way is that the two pictorially identical images include noise that is identical in each image.

The two images for a particular block may be different in two ways. The first way is that motion between the two images causes the two images to be pictorially different. The second way is that the two images are pictorially identical but noise contained in one image may be different from noise contained in the other image. This second way may cause a false determination that motion has occurred between the two images.

Gaussian noise tends to be different from one image to the next. The probability that two images containing gaussian noise contain the exact same distribution of gaussian noise approaches zero exponentially as the number of pixels in the two images increases. The term "gaussian noise" means that the components of the noise has a gaussian distribution. That is, most of the components of the noise have an average value while the noise components that have values higher or lower than the average value are fewer in number and these values decrease the further away the component is from the average. In other words, the noise components form a bell-shaped curve. Just because two images contain the same bell-shaped distribution of noise components does not mean that the noise components occur in the same locations from one image to the next. Most likely, noise components do not occur in the same location from one image to the next. Typically, subtracting gaussian noise in one image from gaussian noise in a second image will not cancel the noise but will result in a difference that has a gaussian distribution. That is, the difference of two gaussian noise images looks like gaussian noise as well.

In the presence of strong gaussian noise (i.e., gaussian noise that would typically be encountered in a sonogram or a radar image) that is different from one image to the next and where the two images are pictorially identical, the sixth step of the method results in data that looks like gaussian noise. If little, or no, noise is present then the result of the sixth step may be little, or no, data. If the images are pictorially different (i.e.,, motion has occurred between the images) then the sixth step of the method, in the presence of much or little noise, results in data that has a distribution that is less gaussian.

So, the sixth step of the method is used to extract the differences between corresponding blocks of the reference image and the test image. The more gaussian is the distribution of the difference between a block of the reference image and its corresponding block in the test image the less likely that motion has occurred in that block. The less gaussian is the distribution of the difference between a block of the reference image and its corresponding block in the test image the more likely that motion has occurred in that block. The result of the sixth step is a set of at most N×M blocks that contain the differences between the reference image and the test image.

The seventh step in the method is to median filter each of the blocks resulting from the sixth step. Median filtering tends to eliminate shot, or spike, noise. To median filter data is to take the data point closest to the middle of the data as the value for each of the data points. For example, if three data points have values (5,10,5) then median filtering this data would result in the data being recognized as (5,5,5). The spike is totally eliminated and is not averaged into the other data. The result of the seventh step is at most N×M median filtered blocks.

The eighth step in the method is to low-pass filter each of the blocks resulting from the seventh step. Low-pass filtering smears any abrupt changes in an image that may be caused by jitter in the acquisition process (i.e., camera jitter). Without the eighth step, camera jitter of a scene that does not include any motion might be falsely determined to include motion. The result of the eighth step is at most N×M low-pass filtered blocks.

The ninth step in the method is to generate a normalized histogram for each of the blocks resulting from the eighth step. Each data point in a normalized histogram has a value (e.g., $histogram\_vector_i$). As mentioned above, the more gaussian is the block of the difference between a block of the reference image and its corresponding block in the test image the less likely motion has occurred in this difference block, and vice versa. A normalized histogram is useful for determining whether or not data is gaussian.

The tenth step in the method is to generate a model of gaussian noise. The noise model is in the form of a probability density function, where each point in the noise model has a value (e.g., $noise\_pdf_i$). The model is not generated from the reference image or the test image. The model is a purely mathematical description of gaussian noise. The model may be based on empirical data of similar scenes (e.g., sonograms, radar images, etc.) but is not derived from the scene presently being monitored. This model will be compared to each normalized histogram of step nine in order to determine whether or not motion has occurred in the block represented by the normalized histogram.

The eleventh step in the method is to calculate the distance between each normalized histogram generated in step nine and the noise model of step ten. The closer is a normalized histogram is to the noise model, the more likely the block represented by the normalized histogram is gaussian and the less likely that motion has occurred in that block. The farther a normalized histogram is from the noise model, the less likely the block represented by the normalized histogram is gaussian and the more likely that motion has occurred in that block. Suitable measures of distance include the Kullback-Leibler "goodness of fit" test, the chi-square test, the Kolmogorov-Smirnov test, and the Anderson-Darling test.

The Kullback-Leibler "goodness of fit" test, which is the preferred distance calculation method of the present invention, is calculated as follows:

$$Distance = \sum_{i=0}^{L} (noise\_pdf_i)$$

$$\log_e((block\_size \times noise\_pdf_i)/histogram\_vector_i)), \text{ where}$$

L is the number of histogram bins, and block_size is the size of the block in pixels.

The twelfth step in the method is to determine whether or not each of the distances calculated in step eleven is at or above a user-definable threshold.

The thirteenth step in the method is to determine if motion has occurred between the reference image and the test image. There are at least two ways to do this. First, if any distance calculation is at, or above, the user-definable threshold then it is determined that motion has occurred between the reference image and the test image. Second, if a user-definable number of distance calculations representing adjoining difference blocks of the reference image and the test image are at, or above, the user-definable threshold then it is determined that motion has occurred between the reference image and the test image. The second latter approach is the preferred step of the present invention for determining whether or not motion has occurred between the reference image and the test image.

To continuously monitor the scene in order to determine whether or not motion has occurred in the scene, additional steps need to be taken. The additional steps are determined by the result of step thirteen.

If no motion was determined in step thirteen then the fourteenth step of the method is to discard the test image, acquire a new test image of the scene, and return to step three for additional processing to determine whether or not motion has occurred between the reference image and the new test image.

If motion was determined in step thirteen then the fourteenth step of the method is to discard the reference image, rename the test image as the new reference image, acquire a new test image, and return to step three for additional processing in order to determine if motion has occurred between the new reference image and the new test image.

Figure 2:
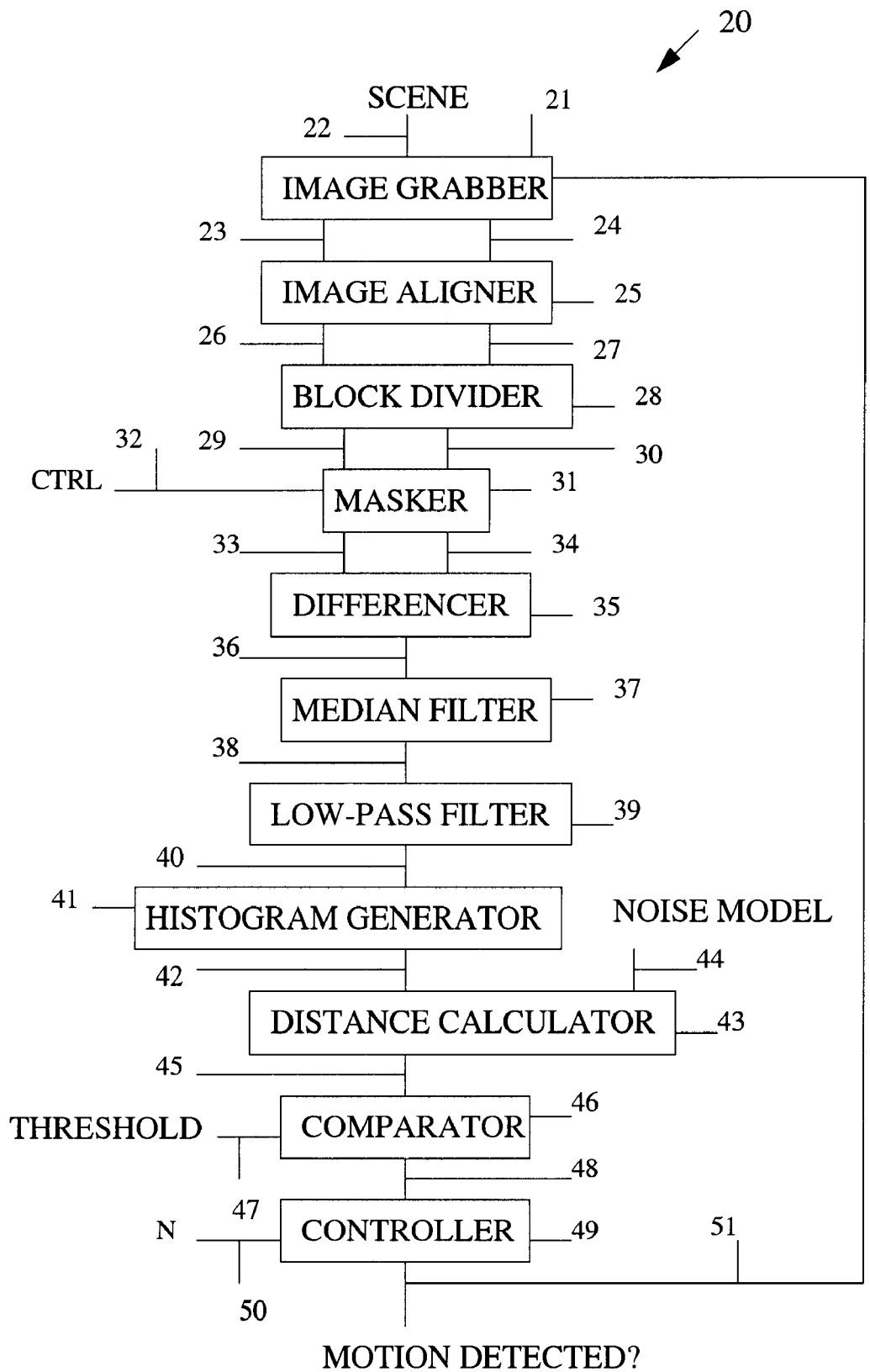
FIG. 2 is a block diagram of the device of the present invention.

FIG. 2 is a block diagram 20 of the device of the present invention.

A first, or reference, image of a scene is acquired using an image grabber 21 along an input 22 to the image grabber 21. Image grabbers are commercially available. Alternatively, an image may also be acquired from an electronic file.

A second image, or test image, of the scene is also acquired along input 22 of the image grabber 21.

The reference image and the test image are provided along outputs 23 and 24, respectively, of the image grabber 21 to an image aligner 25. Image aligners are commercially available. The reference image and the test image must be aligned in order to reduce false detection of motion which may be caused by camera panning or line jitter during image acquisition. Alignment may be done horizontally, vertically, or a combination thereof. In the preferred embodiment, alignment is done horizontally only. The aligned images of the reference image and the test image appear at the outputs 26 and 27, respectively, of the image aligner 25.

The outputs 26 and 27 of the image aligner 25 are connected to a block divider 28. The block divider 28 divides the reference image and the test image into N×M blocks. The user may define the block size. The divided reference image and the divided test image appear at the outputs 29 and 30, respectively, of the block divider 28.

The user may ignore, or mask, certain areas of the divided reference image and divided test image. Masking may be necessary if motion is normally present in the images and should not be used to determine whether or not motion has occurred between the images. For example, wind may cause a tree that is present in the images to sway or the a waterfall may be present in the images. Such motions are not the type of motion that a user is typically looking for. Therefore, it would be convenient to mask such motion. Masking may be accomplished in the present invention by connecting the outputs 29 and 30 to a masker 31. The masker 31 may be a commercially digital signal processor that may be commanded to ignore certain areas of the signals provided thereto. The user may specify the areas that should be masked via a control signal along an input 32 to the masker 31. The masked, or unmasked, reference image and test image appears at the outputs 33 and 34, respectively, of the masker 31.

The outputs 33 and 34 of the masker 31 are differenced using a differencer (or subtractor) 35. Differencers, or subtractors, are known by those skilled in the art. The differencer 35 subtracts corresponding blocks between the reference image and the test image. The difference between the reference image and the test image appears at the output 36 of the differencer 35.

The output 36 of the differencer 35 is connected to a median filter 37. The median filter 37 eliminates shot, or spike, noise from each output 36 of the differencer 35. That is, the difference between each block of the reference image and its corresponding test image is median filtered.

The output of the median filter 38 is connected to a low-pass filter 39. The low-pass filter 39 smears any abrupt changes in a difference block that may be caused by jitter in the acquisition process (i.e., camera jitter). That is, each median-filtered difference block is low-pass filtered. Without this smearing, camera jitter of a scene that does not include any motion might be falsely determined to include motion. The low-pass filter 39 may be realized by a commercially available two-dimensional infinite impulse response (IIR) filter.

The output 40 of the low-pass filter 39 is connected to a histogram generator 41. The histogram generator 41 produces a normalized histogram for each of the difference blocks put out by the low-pass filter 39. Normalized histogram generators are known by those skilled in the art.

The output 42 of the histogram generator 41 is connected to a distance calculator 43. A model of gaussian noise is also provided to the distance calculator along an input 44 to the distance calculator 43. The distance calculator 43 calculates the distance between the noise model and each normalized histogram put out by the histogram generator 41. The closer a normalized histogram is to the noise model the more gaussian is the normalized histogram and the more likely that no motion has occurred between the corresponding blocks of the reference image and the test image represented by the normalized histogram, and vice versa. The distance calculator 43 may implement the Kullback-Leibler "goodness of fit" test, the chi-square test, the Kolmogorov-Smirnov test, or the Anderson-Darling test. In the preferred embodiment, the Kullback-Leibler "goodness of fit" test, which is described above, is implemented in the distance calculator. Any suitable computation device (e.g., central processing unit) that is available commercially may be programmed to compute one of the distance calculations mentioned above.

The output 45 of the distance calculator 43 is connected to a comparator 46. A user-definable threshold is applied along an input 47 to the comparator 46. Any suitable commercial comparator may be used for the comparator 46. The comparator 46 compares each distance calculation put out by the distance calculator 43 to the user-definable threshold. If an output 45 of the distance calculator 43, which is a measure of how gaussian is one difference block, is equal to or greater than the user-definable threshold then the difference block represented by the output 45 is determined to be gaussian. The comparator 46 may put out a logic one level at its output 48 to indicate that a particular input to the comparator 46 is determined to be gaussian and put out a logic zero at its output 48 if the particular input is determined to be non-gaussian.

The output 48 of the comparator 46 is connected to a controller 49. The determination whether or not each difference block is gaussian is passed from the comparator 46 to the controller 49. A non-gaussian determination for all of the difference blocks indicates that motion has not occurred between the reference image and the test image. In the present invention, motion between the reference image and the test image may be determined if one difference block is determined to be gaussian or a user-definable number of adjoining difference blocks are determined to be gaussian. In the preferred embodiment of the present invention, a user-definable number of adjoining difference blocks must be determined to be gaussian before motion is determined to have occurred between the reference image and the test image. An input 50 to the controller 49 allows the user to indicate how many adjoining difference blocks (e.g., N) must be determined to be gaussian before motion is determined.

The output 51 of the controller 49 indicates whether or not motion has occurred between the reference image and the test image. For example, a logic one output may indicate motion and a logic zero output may indicate no motion.

If the scene should be continuously monitored the output 51 of the controller 49 is used to determine what images should be used for the next reference image and the next test image. The output 51 is connected to the image grabber 21 in order to control what images are used for the next reference image and the next test image. If the output 51 of the controller indicates that no motion has occurred between the original reference image and the original test image then the present reference image will be used for the next reference image and a new test image will be acquired by the image grabber 21. The new test image will then be compared to the original reference image, as described above, to determine whether or not motion has occurred between these images.

If motion has occurred between the original reference image and the original test image then the original test image is used as the next reference image and a new test image is acquired by the image grabber 21. The new test image will then be compared to the new reference image, as described above, to determine whether or not motion has occurred between these images.

This process may be repeated for as long as the user wishes to monitor the scene.

What is claimed is:

1. A method of detecting motion between a reference image and a test image, comprising the steps of:
   a) acquiring the reference image;
   b) acquiring the test image;
   c) aligning the reference image and the test image;
   d) dividing the reference image and the test image each into N×M blocks, where N and M are user-definable integers;
   e) masking a user-definable number of blocks of the reference image and the test image;
   f) differencing each pair of corresponding blocks in the reference image and the test image;
   g) median filtering each result of the last step;
   h) low-pass filtering each result of the last step;
   i) generating a normalized histogram for each result of the last step;
   j) generating a model of gaussian noise;
   k) calculating a distance between the model of gaussian noise and each result of step (i);
   l) comparing the results of the last step to a user-definable threshold; and m) determining that no motion has occurred between the reference image and the test image if a user-definable number of results of the last step where below the user-definable threshold, otherwise determining that motion has occurred between the reference image and the test image.

2. The method of claim 1, further including the step of discarding the test image, acquiring a new test image, and returning to step (c) if no motion has been determined in step (m), otherwise, replacing the reference image with the test image, acquiring a new test image, and returning to step (c).

3. The method of claim 1, wherein said step of aligning the reference image and the test image is comprised of using an alignment technique selected from the group consisting of horizontal alignment, vertical alignment, and horizontal and vertical alignment.

4. The method of claim 1, wherein said step of generating a model of gaussian noise comprises generating a model of gaussian noise for noise commonly encountered in sonograms.

5. The method of claim 1, wherein said step of generating a model of gaussian noise comprises generating a model of gaussian noise for noise commonly encountered in radar images.

6. The method of claim 1, wherein said step of calculating a distance comprises calculating a distance using a distance calculation selected from the group consisting of a Kullback-Leibler "goodness of fit" test, a chi-square test, a Kolmogorov-Smirnov test, and an Anderson-Darling test.

7. The method of claim 2, wherein said step of aligning the reference image and the test image is comprised of using an alignment technique selected from the group consisting of horizontal alignment, vertical alignment, and horizontal and vertical alignment.

8. The method of claim 7, wherein said step of generating a model of gaussian noise comprises generating a model of gaussian noise for noise commonly encountered in sonograms.

9. The method of claim 8, wherein said step of generating a model of gaussian noise comprises generating a model of gaussian noise for noise commonly encountered in radar images.

10. The method of claim 9, wherein said step of calculating a distance comprises calculating a distance using a distance calculation selected from the group consisting of a Kullback-Leibler "goodness of fit" test, a chi-square test, a Kolmogorov-Smirnov test, and an Anderson-Darling test.

11. A device for detecting motion between a reference image and a test image, comprising:

a) an image grabber, having a first input for acquiring the reference image and the test image, having a second input, having a first output for transmitting the reference image, and having a second output for transmitting the test image;

b) an image aligner, having a first input connected to the first output of said image grabber, having a second input connected to the second output of said image grabber, having a first output for transmitting the aligned reference image, and having a second output for transmitting the aligned test image;

c) a block divider, having a first input connected to the first output of said image aligner, having a second input connected to the second output of said image aligner, having a first output for transmitting a divided reference image, and having a second output for transmitting a divided test image;

d) a masker, having a first input connected to the first output of said block divider, having a second input connected to the second output of said block divider, having a third input for receiving a control signal that indicates which blocks should be masked, having a first output for transmitting un-masked blocks of the reference image, and having a second output for transmitting a un-masked blocks of the test image;

e) a differencer, having a first input connected to the first output of said masker, having a second input connected to the second output of said masker, and having an output for transmitting blocks that represent the differences between the blocks of the reference image and corresponding blocks of the test image;

f) a median filter, having an input connected to the output of said differencer, and having an output;

g) a low-pass filter, having an input connected to the output of said median filter, and having an output;

h) a histogram generator, having an input connected to the output of said low-pass filter, and having an output;

i) a distance calculator, having a first input connected to the output of said histogram generator, having a second input for receiving a model of gaussian noise, and having an output;

j) a comparator, having a first input connected to the output of said distance calculator, having a second input for receiving a user-definable threshold, and having an output; and k) a controller, having a first input connected to the output of said comparator, having a second input for receiving a user-definable number, and having an output connected to the second input of said image grabber.

12. The device of claim 11, wherein said low-pass filter is comprised of a two-dimensional infinite impulse response filter.

13. The device of claim 11, wherein said distance calculator implements distance calculations selected from the group consisting of a Kullback-Leibler "goodness of fit" test, a chi-square test, a Kolmogorov-Smirnov test, and an Anderson-Darling test.

14. The device of claim 12, wherein said distance calculator implements distance calculations selected from the group consisting of a Kullback-Leibler "goodness of fit" test, a chi-square test, and an Anderson-Darling test.

* * * * *